US008737057B2

(12) United States Patent
Terry

(10) Patent No.: US 8,737,057 B2
(45) Date of Patent: May 27, 2014

(54) PUSH-PUSH EJECT DISK DRIVE CHASSIS

(75) Inventor: Julian M. Terry, Los Gatos, CA (US)

(73) Assignee: Drobo, Inc., San Jose, CA (US)

( * ) Notice: Subject to any disclaimer, the term of this patent is extended or adjusted under 35 U.S.C. 154(b) by 348 days.

(21) Appl. No.: 13/234,359

(22) Filed: Sep. 16, 2011

(65) Prior Publication Data

US 2013/0070415 A1 Mar. 21, 2013

(51) Int. Cl.
*G06F 1/16* (2006.01)

(52) U.S. Cl.
USPC .................. 361/679.37; 361/679.33; 439/159

(58) Field of Classification Search
USPC ............. 361/679.31–679.39, 679.33, 679.37; 439/159
See application file for complete search history.

(56) References Cited

U.S. PATENT DOCUMENTS

| 5,573,413 | A | 11/1996 | David et al. .................... 439/159 |
| 6,071,134 | A | 6/2000 | Tung .............................. 439/159 |
| 6,095,834 | A | 8/2000 | Lai et al. ........................ 439/159 |
| 6,572,392 | B2 * | 6/2003 | Motojima ...................... 439/159 |
| 6,619,971 | B1 | 9/2003 | Chen .............................. 439/159 |
| 6,948,956 | B2 * | 9/2005 | Ngo ............................... 439/155 |
| 7,018,222 | B2 * | 3/2006 | Chang ........................... 439/159 |
| 7,077,671 | B2 * | 7/2006 | Su et al. ......................... 439/159 |
| 7,570,484 | B1 * | 8/2009 | Sivertsen ................. 361/679.37 |
| 7,997,914 | B2 * | 8/2011 | Bychkov et al. .............. 439/159 |
| 8,337,224 | B2 * | 12/2012 | Bychkov et al. .............. 439/159 |
| 2002/0192991 | A1 | 12/2002 | Motojima ...................... 439/157 |
| 2005/0152110 | A1 | 7/2005 | Chen .............................. 361/685 |
| 2005/0201053 | A1 * | 9/2005 | Scicluna et al. .............. 361/685 |
| 2006/0250766 | A1 * | 11/2006 | Blaalid et al. ................. 361/685 |
| 2007/0155210 | A1 | 7/2007 | Matsukama et al. .......... 439/159 |
| 2008/0081677 | A1 | 4/2008 | Lai ............................... 455/575.1 |
| 2008/0195814 | A1 * | 8/2008 | Chuang ......................... 711/115 |
| 2008/0225494 | A1 * | 9/2008 | Yang .............................. 361/727 |
| 2009/0016009 | A1 * | 1/2009 | Barrall et al. ................. 361/684 |
| 2009/0311903 | A1 | 12/2009 | Bychkov et al. .............. 439/352 |
| 2012/0036322 | A1 * | 2/2012 | Klein ............................ 711/114 |

FOREIGN PATENT DOCUMENTS

KR 10-2006-0064173 6/2006

OTHER PUBLICATIONS

3ware, Inc. "3ware RDC-300 RAID Drive Cage Quick Start Guide" product description, (Date created Mar. 22, 2001), 4 pages www.3ware.com/products/pdf/3wareRAIDDriveCage.pdf.
CNET, "3 Ware RAID Drive Cage 300—hard drive hot-plug cage specifications" product description, (May 3, 2003), 2 pages http://reviews.cnet.com/i-o-cards/3 ware-raid-drive-cage/1707-3019_7-30264758.html.

(Continued)

*Primary Examiner* — Adrian S Wilson
(74) *Attorney, Agent, or Firm* — Sunstein Kann Murphy & Timbers LLP

(57) ABSTRACT

A push-push eject disk drive chassis user-swappably accepts a disk drive, without tools or a caddy and is sufficiently narrow, such that two such chassis may be disposed side-by-side within a housing having a standard disk drive form factor and accept disk drives having smaller form factors. A data storage system that conforms to a disk drive form factor and that can be installed into a disk drive bay of a user computer includes a plurality of such disk drive chassis user-swappably accepts a plurality of side-by-side disk drives, without tools or caddies. The data storage system may include electronics that manage storage space on any disk drives installed in the chassis and present the cumulative storage space (less space used for overhead and redundancy) as a single virtual disk drive to the user computer.

15 Claims, 12 Drawing Sheets

(56) References Cited

OTHER PUBLICATIONS

Yamaichi Electronics, "FMS Series SIM Card Reader (Push/Push, Std. Type w/o Switch)" product description, (Date created Jun. 24, 2004), 2 pages common.leocom.jp/datasheets/222108_27814.pdf.

Comix International Co. Ltd, "Portable Dual Drive (RAID) Modules" product description, (Date created Sep. 26, 2008), 1 page www.comix.com.tw/products/RM/hd2221/hd2221.pdf.

Comix International Co. Ltd, "HD-228RSH 2-Bay 2.5 HDD/SSD Internal RAID Enclosure" product description, (Date created Sep. 10, 2009), 1 page, www.comix.com.tw/products/RM/hd_228rsh/hd_228rsh.pdf.

Raidon Technology, Inc., "Raidion SR 2760-2S-S2+" product description, (Date created Sep. 18, 2009), 2 pages www.stc-computech.com/_Datasheet_SR2760-2S-S2_-en_v1.0.pdf.

Comix International Co. Ltd, "ST-1040SS 4-Bay 2.5" SAS/SATA HDD Backplane Module in 1×5.25 "Bay" product description, (Date created Oct. 22, 2009), 1 page www.comix.com.tw/products/RM/st_1040ssist_1040ss.pdf.

Molex, "SD Memory Card Connector" product description, (Date created May 18, 2010), 2 pages www.symmetron.ua/files/987650-4061.PDF.

"Disk Enclosure," Wikipedia.org, (Aug. 22, 2010), 6 pages http://en.wikipedia.org/w/index.php?title=Disk_enclosure&oldid=380351855.

Comix International Co. Ltd, "ST-1040SS 4-Bay 2.5" SAS/SATA HDD Backplane Modules in 1+5.25" Bay Specifications" product description, (2010), 1 page http://www.comix.com.tw/?page=product&section=RM&productID=st_1040ss.

Molex, "SD Memory Card Connector" product description, (2011), 1 page http://www.molex.com/molex/products/family?key=sd_memory_card_connectors&channel=products&chanName=family&pageTitle=Introduction.

SunnyTek Information Co., Ltd. ST-1040 SS web page description, http://www.snt.com.tw/s03product/ProductShow.asp?id=82, 3 pages, May 23, 2011.

International Searching Authority, International Search Report and the Written Opinion for International Application No. PCT/US2012/051174 dated Feb. 18, 2013, 9 pages.

* cited by examiner

PUSH-PUSH EJECT DISK DRIVE CHASSIS

TECHNICAL FIELD

The present invention relates to digital data storage systems and, more particularly, to a push-push eject disk drive chassis and a digital data storage system that includes a plurality of such chassis disposed within a common housing.

BACKGROUND ART

Data storage systems include provisions for housing and managing one or more physical digital data storage devices and making digital data storage space on the installed storage devices available to one or more data-connected user computers. A storage system that includes multiple storage devices is sometimes referred to as a storage "array." A storage array may have bays (slots) in which storage devices can be installed. Many storage arrays are designed to allow non-technical end users to install and remove storage devices in the slots without tools. A storage array may support one or more types of storage device (e.g., magnetic disk drives, optical disk drives, solid state storage units such as flash and USB drives, tape drives, etc.). The DROBO™ data storage system available from Drobo, Inc., Santa Clara, Calif., is an example of a storage array having slots for multiple storage devices (specifically disk drives).

Typically, the cumulative storage space of all the installed storage devices (less space used for overhead and redundancy) is made to appear to the user computers as a single virtual disk. Storage systems control the installed storage devices and manage the storage capacity provided by the installed storage devices. For example, some data storage systems may store data redundantly on two or more of the installed storage devices, in case one of the storage devices fails.

Auxiliary applications, sometimes referred to as "dashboard" applications, may provide user interfaces to data storage systems. For example, a dashboard application may provide a graphical display, such as a pie chart, that indicates how the storage space on the storage devices is currently being used, i.e., the amount of storage space that is currently free, reserved for expansion, used for protection (data redundancy) and used for overhead. A dashboard application may be executed by a user computer that is connected to a data storage system via a wired or wireless computer network, a universal serial bus (USB) cable, or the like.

Many such data storage systems are designed to be used by unsophisticated users. For example, a data storage system may be configured such that storage devices may be added to or removed from the data storage system by a user without use of tools, without powering down the data storage system or the user computer, and without the user interacting with any management software. A user may increase the total amount of storage space in the data storage system simply by sliding an additional storage device into an available slot or by replacing an existing storage device with a storage device having a larger capacity. Similarly, a user may replace a failed storage device with a replacement storage device.

Software in the data storage system automatically detects the insertion and removal of storage devices. In response, the software formats newly inserted storage devices, copies data to storage devices that have been inserted to replace failed storage devices, etc. Thus, the user may treat the data storage system as a storage "appliance," without understanding or managing its operation. The user may treat physical storage devices as commodities having stated capacities.

However, in order to accommodate several installed data storage devices, many present data storage systems, such as the above-mentioned DROBO™ data storage system, are too large to be physically installed inside user computers. Instead, many data storage systems are external, stand-alone systems that to connect to user computers via computer networks, USB cables, or the like.

On the otherhand, some data storage systems, such as the Raidon InTANK SR2760-2S-S2+, available from Raidon Technology, Inc., New Taipei City, Taiwan (R.O.C.), are configured to conform to the form factor of 3.5-inch hard disk drives (HDD) and, therefore, may be installed inside user computers. For example, the Raidon data storage system accepts up to two 2.5-inch serial ATA (SATA) disk drives. Other products, such as the ST-1040 SS HDD backplane module available from SunnyTek Information Co., Ltd., Sanchung City, Taipei, Taiwan (R.O.C.), support installing up to four 2.5-inch disk drives into a housing configured to conform to the form factor of a 5.25-inch disk drive. However, the SunnyTek device does not manage storage space on installed disk drives. Instead, the ST-1040 SS device merely allows physically mounting the four disk drives in the housing and installing the housing in a user computer. The housing includes four SATA connectors on the back of the device that merely make signals from the installed disk drives available external to the housing. A separate disk drive controller, such as a redundant array of independent disks (RAID) controller card, external to the SunnyTek device, is required to manage the storage space.

Furthermore, these and other internally mounting devices require each disk drive to be inserted into a special caddy, before the disk drive can be installed in the mounting devices, or they require tools for installing or de-installing disk drives. Caddies can pose problems, especially for unsophisticated users. For example, a disk drive must be positioned correctly in a caddy, before the caddy is inserted into a storage system.

United States Pat. Publ. No. 2009/0311903 to Eyal Bychkov, et al., describes a push-to-insert, push-to-eject and pull-to-extract card connector. The Bychkov device accepts miniature electronic devices, such as small memory cards and small communication cards. The device includes a moveable, spring-loaded receptacle that "floats" in its chassis. The Bychkov device does not require caddies. However, even if the Bychkov device could be modified to accept disk drives, the Bychkov device appears to be too wide to accommodate two 2.5-inch disk drives, side-by-side, in a housing configured to conform to the form factor of a 5.25-inch disk drive.

The prior art fails to meet the needs of users of data storage systems. No prior art device conforms to the form factor of a disk drive and user-swappably accepts a plurality of smaller form factor disk drives into respective drive slots, without tools or caddies. Furthermore, no known combination of prior art devices would provide such a data storage system.

SUMMARY OF EMBODIMENTS

An embodiment of the present invention provides a push-push eject disk drive chassis. The chassis includes a frame that defines an opening. The opening has a major axis. The frame is configured to receive at least a portion of a disk drive, through the opening, along a receiving axis. A truck is disposed within the frame. The truck is configured for reciprocal translation, relative to the frame, along the receiving axis. A spring is coupled to the truck. The spring is configured to urge the truck toward the opening. An electrical connector is attached to the truck. The electrical connector translates with the truck. The electrical connector is configured to electrically couple with a received disk drive. A toggle is disposed in a plane oriented parallel to the major axis of the opening and parallel to the receiving axis. The toggle is mechanically coupled to the truck. The toggle is configured to alternately limit translation of the truck toward the opening between a near limit and a far limit of the truck. The truck is closer to the opening at the near limit than at the far limit.

The toggle may include a track plate oriented parallel to the major axis of the opening and parallel to the receiving axis. The track plate may define a track. The toggle may also include a follower pin. At least a portion of the follower pin may be disposed within the track. The track plate or the follower pin is attached to the truck for translation with the truck. The position of the follower pin, along the track, depends at least in part on the position of the truck along the receiving axis. The track and the follower pin are configured such that a first location along the track corresponds to the far limit of the truck. Absent an external force on the truck along the receiving axis, the force of the spring maintains the follower pin at the first location along the track.

The track may include a groove defined in a surface of the track plate. The track may include a tortuous loop track. The track plate may further define a lead-in portion extending from an edge of the track plate to the loop track. The lead-in portion may be configured to guide the follower pin from the edge of the track plate to the loop track. Once the follower pin is in the loop track, the lead-in portion is configured to prevent the follower pin escaping the loop track, via the lead-in portion, to the edge of the track plate, absent an external force on the follower pin.

The track may be further configured to limit translation of the truck to between the near limit of the truck and a third position more distant from the opening than the far limit of the truck.

The toggle may include a pivoted multi-notched cam, a non-pivoted stop and a pivoted stop.

The push-push eject disk drive chassis may also include a lock configured to be automatically engaged with a received disk drive when the truck is at the far limit. The lock may be configured to be automatically disengaged from the received disk drive when the truck is at the near limit.

The push-push eject disk drive chassis may also include a lock configured to automatically engage a received disk drive as the truck translates away from the near truck limit. The lock may be configured to automatically disengage the received disk drive as the truck translates toward the near truck limit.

The frame may define a lock track extending parallel to the receiving axis. The lock may include a sloped portion configured to reciprocally translate within the lock track. The lock may also include a lock pin connected to the sloped portion and configured to selectively engage a hole defined by the received disk drive. The sloped portion, the lock pin and the lock track may be configured such that, as the sloped portion translates away from the near truck limit, proximate an end of the lock track, the end of the lock track progressively depresses the sloped portion, thereby progressively engaging the lock pin into the hole.

The frame may define a second lock track extending parallel to the receiving axis. The lock may include a second sloped portion configured to reciprocally translate within the second lock track. The lock may also include a second lock pin connected to the second sloped portion and configured to selectively engage a second hole defined by the received disk drive. The second sloped portion, the second lock pin and the second lock track may be configured such that, as the second sloped portion translates away from the near truck limit, proximate an end of the second lock track, the end of the second lock track progressively depresses the second sloped portion, thereby progressively engaging the second lock pin into the second hole.

Another embodiment of the present invention provides a data storage system. The data storage system includes a housing configured according to a standard disk drive form factor. The housing may includes an output disk drive data connector. The housing may define four openings in a front panel of the housing. Four push-push eject disk drive chassis may be disposed within the housing. Each push-push eject disk drive chassis may be aligned with a respective one of the four openings in the front panel. Each push-push eject disk drive chassis may be oriented to user-swappably receive at least a portion of a disk drive through the respective opening in the front panel. A circuit board may be disposed within the housing and electrically coupled to the output disk drive data connector. The circuit board may be coupled to a respective disk drive data connector of each of the push-push eject disk drive chassis. The circuit board may be configured to manage data storage space on any disk drives received by the four push-push eject disk drive chassis and electrically coupled to the respective disk drive data connectors thereof The circuit board may be configured so as to present the data storage space of the received disk drives as a single disk drive, via the output disk drive data connector.

Each of the push-push eject disk drive chassis may include a frame defining an opening having a major axis. The frame may be configured to receive at least a portion of a disk drive, through the respective opening in the front panel and then through the opening in the frame, along a receiving axis. A truck may be disposed within the frame and configured for reciprocal translation, relative to the frame, along the receiving axis. A spring may be coupled to the truck and configured to urge the truck toward the opening. A disk drive data connector may be attached to the truck for translation therewith and configured to electrically couple with a received disk drive. A toggle may be disposed in a plane oriented parallel to the major axis of the opening and parallel to the receiving axis. The toggle may be mechanically coupled to the truck and configured to alternately limit translation of the truck toward the opening between a near limit and a far limit of the truck. The truck is closer to the opening at the near limit than at the far limit.

The data storage system may also include, for each of the four push-push eject disk drive chassis, at least one corresponding visual indicator in the front panel. The visual indicator(s) may be coupled to the circuit board so as to display status information about any disk drive received by the push-push eject disk drive chassis and electrically coupled to the disk drive data connector thereof.

Each of the at least one visual indicators may be coupled to the circuit board via a respective light pipe. The housing may be configured to conform to a 5.25-inch disk drive form factor. Each of the four push-push eject disk drive chassis may be configured to receive a 2.25-inch form factor disk drive.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, there is disclosed a push-push eject disk drive chassis that user-swappably accepts a disk drive, without tools or a caddy. (As used herein, the term "disk drive" refers to a mechanical disk drive or a so-called "solid state disk.") The chassis is narrow, such that, in some embodiments, two such chassis may be disposed side-by-side within a housing having a standard disk drive form factor. For example, two disk drive chassis that accept 2.5-inch form factor disk drives may be included side-by-side in a 5.25-inch form factor housing, or four such disk drive chassis may be included in a 2×2 arrangement in a 5.25-inch form factor housing. Thus, in accordance with other embodiments of the present invention, a data storage system that conforms to a disk drive form factor can be installed into a disk drive bay of a user computer and can user-swappably accept a plurality of side-by-side disk drives of a smaller form factor, without tools or a caddy. Such a data storage system includes a push-push eject disk drive chassis for each receivable disk drive. The data storage system may include electronics, such as a processor executing instructions stored in a memory, that manage storage space on any disk drives installed in the chassis and present the cumulative storage space (less space used for overhead and redundancy) as a single virtual disk drive to the user computer.

Figure 1:
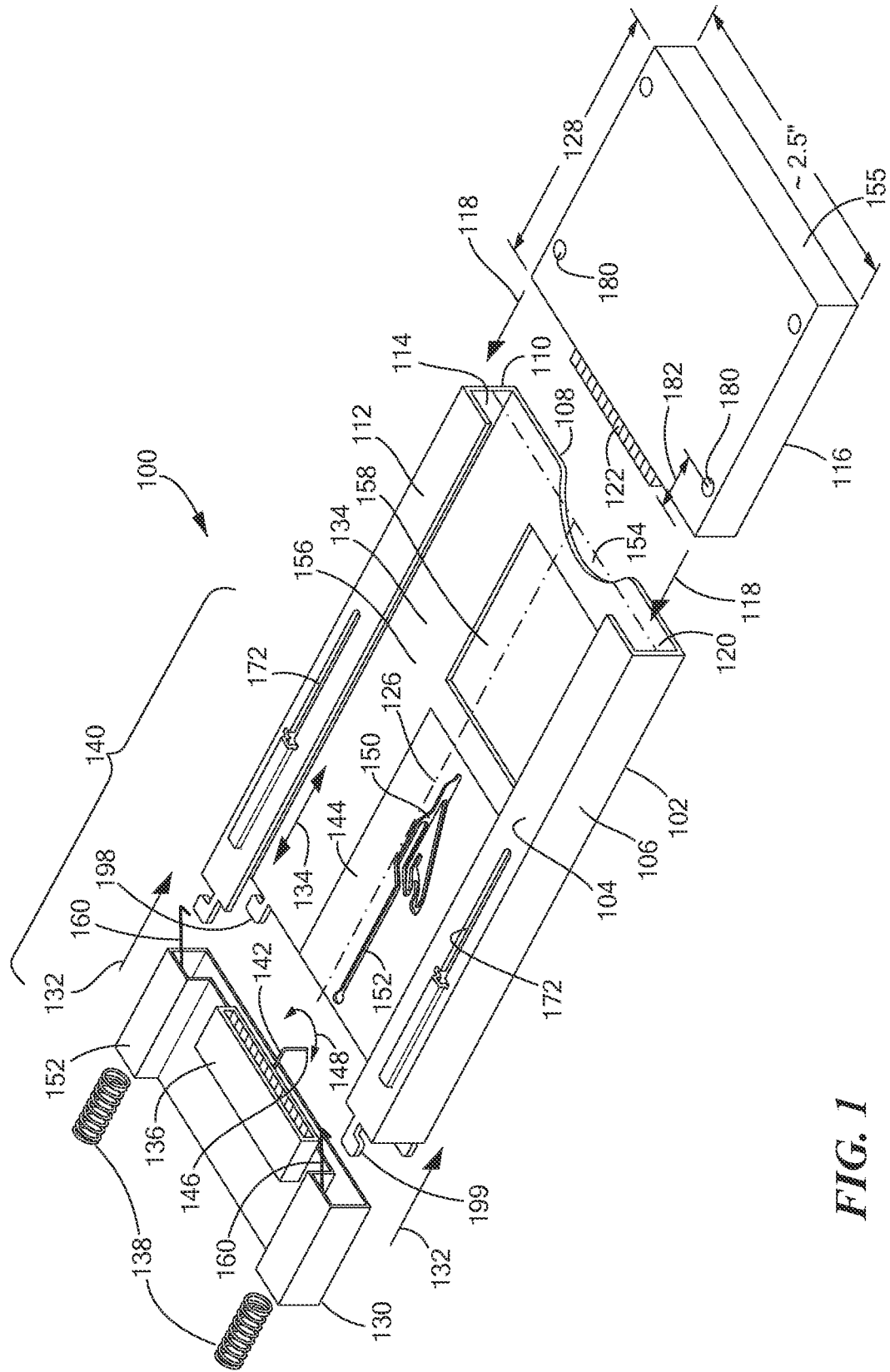
FIG. 1 is a perspective exploded view of a disk drive chassis, according to an embodiment of the present invention.

FIG. 1 is a perspective exploded view of a disk drive chassis 100, according to an embodiment of the present invention. The disk drive chassis 100 includes a frame 102 having walls 104, 106, 108, 110 and 112 that, collectively, define a rectangular cross-section-shaped disk drive receiving channel 114, sized and configured to slidingly receive at least a portion of a disk drive 116, as indicated by arrows 118. One end of the frame 102 defines an opening 120 to receive a "business end" of the disk drive 116, i.e., the end of the disk drive 116 that includes a data connector 122. The disk drive 116 is shown schematically. In one embodiment, the disk drive 116 may have a form factor commonly referred to as a 2.5-inch disk drive form factor. However, in other embodiments, the disk drive 116 may conform to other form factors. The disk drive 116 data connector 122 is shown schematically. The data connector 122 may be, for example, an SATA connector. The data connector 122 may, but need not, include power pins for supplying electrical power to the disk drive 116, as is well known in the art.

The opening 120 in the frame 102 has a major axis 124, i.e., the major axis 124 is oriented along the larger dimension of the opening 120. The disk drive 116 is received through the opening 120 and into the frame 102 along a receiving axis 126. However, the entire length 128 of the disk drive 116 need not necessarily be received within the frame 102, as described below.

Figure 2:
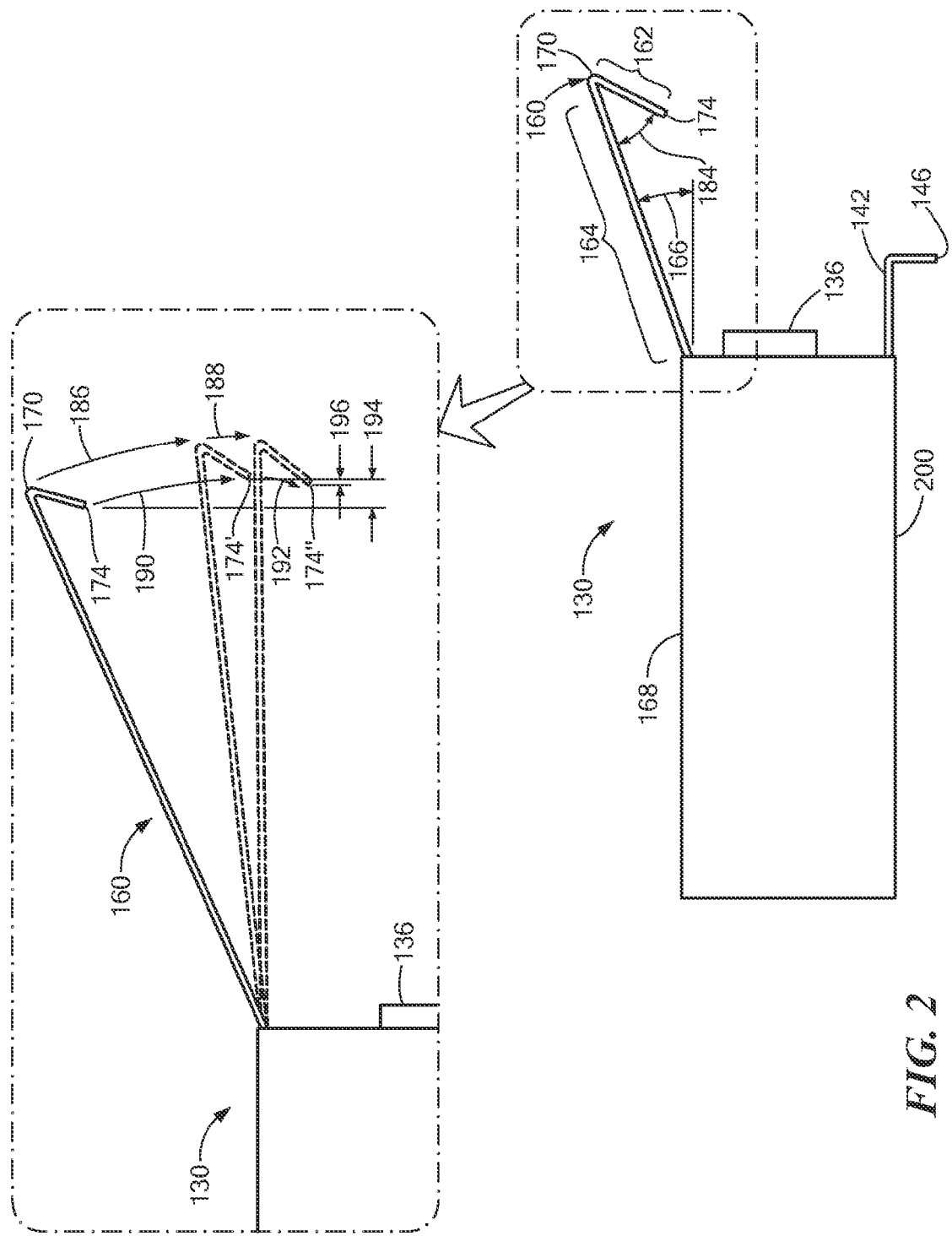
FIG. 2 is a side view of a truck of the disk drive chassis of FIG. 1, according to an embodiment of the present invention; an insert in FIG. 2 provides an enlarged view of a circled portion of FIG. 2.
Figure 13:
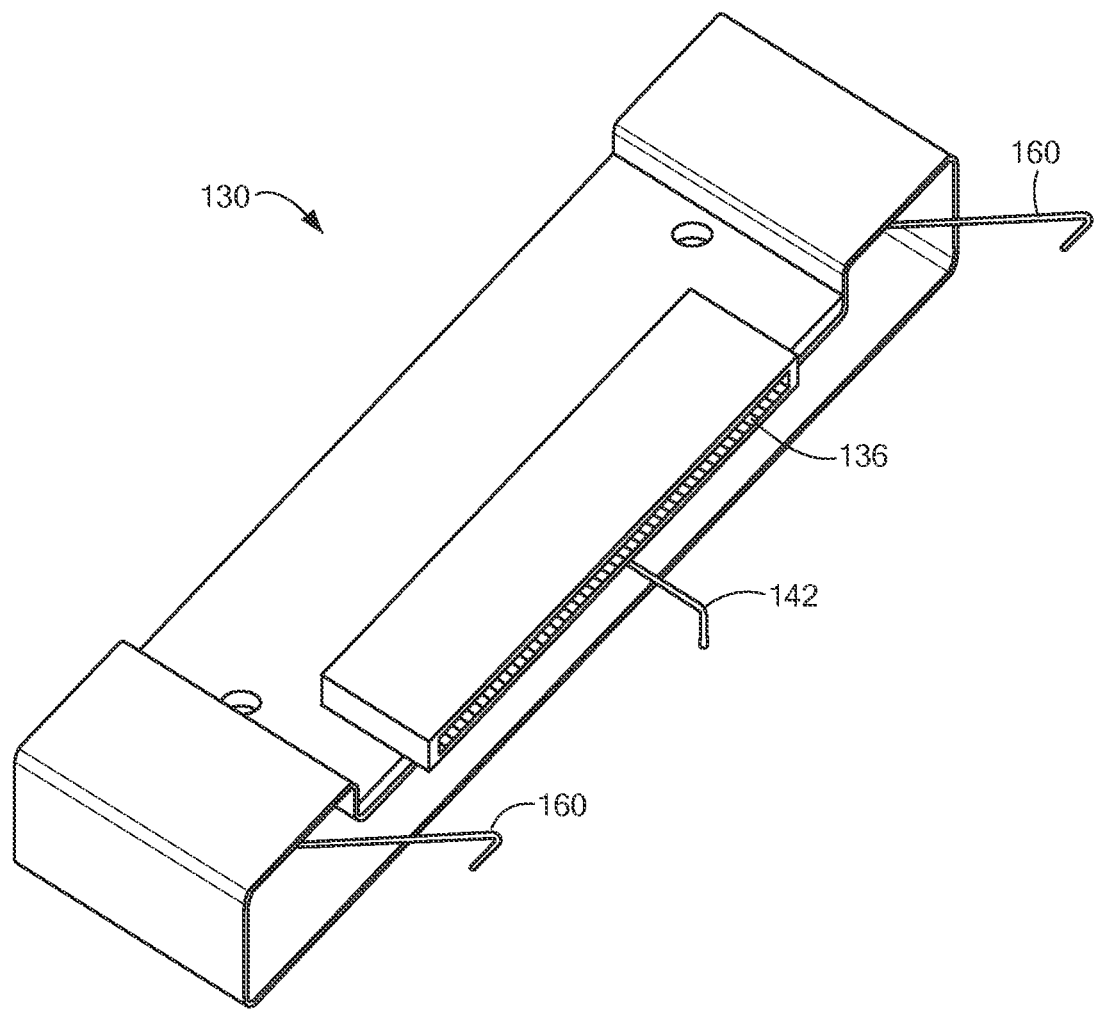
FIG. 13 is a close-up perspective view of the truck of the disk drive chassis of FIG. 1, according to an embodiment of the present invention.

A truck 130, side and close-up perspective views of which are provided in FIGS. 2 and 13, respectively, is sized and configured to be received within the frame 102, as indicated by arrows 132. Once received within the frame 102, the truck 130 may translate reciprocally, relative to the frame 102, along the receiving axis 126, as indicated by two-headed arrow 134. ("Reciprocal translation" means movement forward and backward alternately in a substantially straight line, although not necessarily the same distance in each direction and not necessarily the same distance each time in a given direction.) An electrical connector 136, configured to mate with the data connector 122 of the disk drive 116, is attached to the truck 130. Therefore, the electrical connector 136 translates with the truck 130.

Springs 138 urge the truck 130 toward the opening 120 in the frame 102. Although two coil springs 138 are shown, other numbers and other configurations of springs may be used.

Translation of the truck 130 along the receiving axis 126 is, however, limited by a toggle 140. According to one embodiment, the toggle 140 includes a follower pin 142 attached to the truck 130 and a track plate 144 attached to the frame 102. The follower pin 142 and track plate 144 effectively provide stops that constrain the translation of the truck 130. The follower pin 142 is resilient or spring-loaded to allow a downward-projecting end 146 of the follower pin 142 to be deflected in either direction of a neutral position, relative to the truck 130. This side-to-side movement of the end 146 of the follower pin 142, indicated by a two-headed arrow 148, occurs within a plane parallel to the wall 108 of the frame 102. If the end 146 of the follower pin 142 is deflected, the resilience or spring loading urges the end 146 to return to its neutral position. FIG. 1 shows the follower pin 142 in its neutral position.

Figure 3:
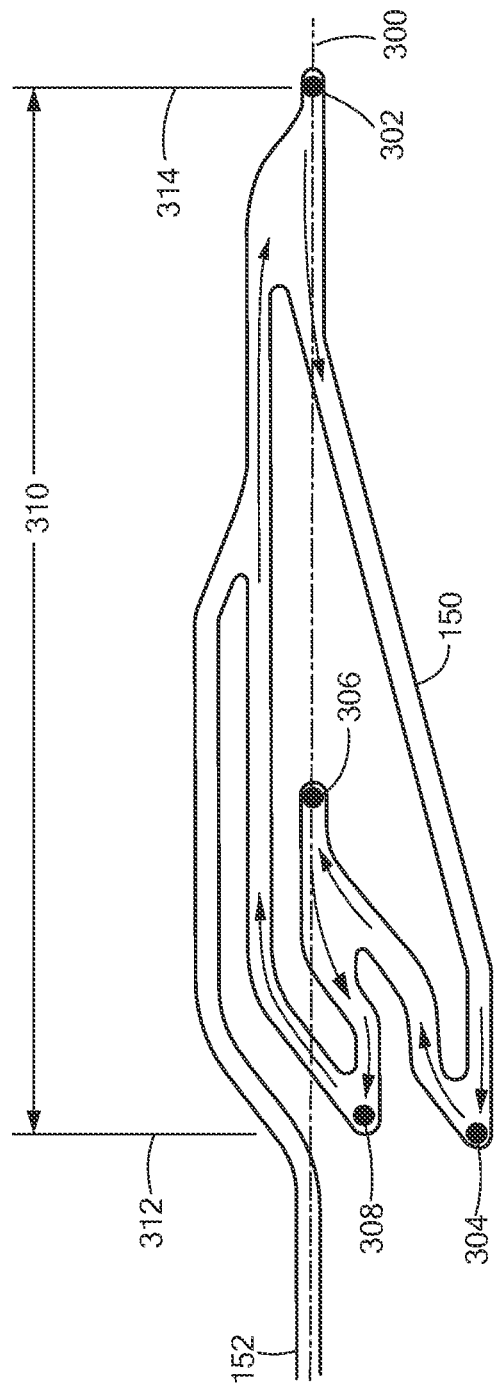
FIG. 3 is a close-up plan view of a tortuous groove defined by the disk drive chassis of FIG. 1, according to an embodiment of the present invention.

The track plate 144 is attached to, or part of, the wall 108 of the frame 102. The toggle 140 is, therefore, oriented parallel to the major axis 124 of the opening 120 and parallel to the receiving axis 126. The track plate 144 may be made of a suitable plastic or other material or combination and defines a tortuous groove 150, within which the end 146 of the follower pin 142 rides, once the truck 130 has been assembled to the frame 102. FIG. 3 is a close-up plan view of the tortuous groove 150. The groove 150 forms a loop, as indicated by arrows in FIG. 3, which the end 146 of the flower pin 142 travels along; however, a lead-in portion 152 of the groove 150 facilitates assembling the truck 130 to the frame 102.

As the truck 130 translates along the receiving axis 126, the neutral position of the end 146 of the follower pin 142 translates along a line 300, relative to the track plate 144. The end 146 of the follower pin 142 is, therefore, always urged toward the line 300.

The lead-in portion 152 guides the end 146 of the follower pin 142, such as from or near an edge of the track plate 144, to the loop track during assembly. Once the end 146 of the follower pin 142 is in the loop track, the shape of the loop track and the urging of the end 146 of the follower pin 142 toward the line 300 prevent the follower pin 142 from escaping the loop track, via the lead-in portion 152, back to the edge of the track plate 144, absent an external force on the follower pin 142, such as during intentional disassembly of the disk drive chassis 100. The major side of the disk drive 116 that is hidden from view in FIG. 1 serves to prevent the follower pin 142 from jumping out of the groove 150.

Four positions, 302, 304, 306 and 308, of the end 146 of the follower pin 142 are shown schematically along the loop track in FIG. 3. Once the end 146 of the follower pin 142 is captured within the loop track of the groove 150, the groove 150 limits translation of the end 146 of the follower pin 142 in the direction of the receiving axis 126 to a range 310, i.e., between two extremes 312 and 314. The truck 130 is also, therefore, limited to translate along the receiving axis 126 a distance no greater than the range 310.

With the end 146 of the follower pin 142 at position 302, the truck 130 is located closer to the opening 120 than at any other position of the end 146 of the follower pin 142 along the loop track of the groove 150. This position of the truck 130 is referred to as the "near limit" of the truck 130. Recall that the truck 130 is urged by springs 138 toward the opening 120. Thus, because the groove 150 defines a sharp turn or corner in the loop track at position 302, absent an external force, such as a force exerted by a user, via an inserted disk drive 116 and the electrical connector 136, on the truck 130, the springs 138 maintain the end 146 of the follower pin 142 in position 302 and, therefore, the truck 130 is maintained at the near limit. That is, the springs 138 force the end 146 of the follower pin 142 into the corner in the loop track, from which the follower pin 142 can not escape, absent an external force. Position 306 of the end 146 of the follower pin 142 corresponds to a "far limit" of the truck 130, as described in more detail below.

With the truck 130 at the near limit, the disk drive chassis 100 is ready to begin accepting a disk drive 116. A user inserts an end of the disk drive 116 into the opening 120. In one embodiment, the springs 138 are sufficiently stiff such that, once the data connector 122 of the inserted disk drive 116 contacts the electrical connector 136, further insertion of the disk drive 116 causes the two data connectors 122 and 136 to mate, without displacing the truck 130. Once the two data connectors 122 and 136 are mated, further insertion of the disk drive 116 displaces the truck 130, against the urging of the springs 138, away from the opening 120. With this displacement of the truck 130, the end 146 of the follower pin 142 travels in the groove 150, from position 302 toward position 304. When the end 146 of the follower pin 142 reaches position 304, translation of the follower pin 142 away from the opening 120 stops and, therefore, the truck 130 can not translate any further from the opening 120, along the receiving axis 126.

If the data connector 122 of the disk drive 116 is not yet fully mated with the electrical connector 136, such as in embodiments with less stiff springs 138, continued urging by the user mates the two connectors 122 and 136. Thus, the position 304 along the groove 150 provides a stop for the truck 130, against which the user may press the inserted disk drive 116 to positively mate the two connectors 122 and 136.

Therefore, the position 304 provides a third limit on the translation of the truck 130. This third limit is more distant from the opening 120 than the far limit is from the opening 120. However, the third limit stops the truck 130 from translating beyond the limit in a direction away from the opening 120, whereas the near limit and the far limit prevent the truck 130 from traveling beyond the limits in a direction toward the opening 120.

When the user releases enough of the insertion force on the disk drive 116, the springs 138 force the truck 130 and, therefore, the end 146 of the follower pin 142, toward the opening 120. The resilience or spring loading of the follower pin 142 and the shape of the groove 150 force the end 146 of the follower pin 142 to follow the arrow toward position 306, rather than returning to position 302. That is, the resilience or spring loading of the follower pin 142 urges the end 146 of the follower pin 142 toward the line 300, thus preventing the end 146 of the follower pin 142 from backtracking to position 302.

When the user fully releases the insertion force on the disk drive 116, the springs 138 maintain the end 146 of the follower pin 142 in position 306. With the end 146 of the follower pin 142 in position 306, the truck 130 is located further from the opening 120 than when the truck 130 is at the near limit, i.e., when the end 146 of the follower pin 142 is in position 302. This position of the truck 130 is referred to as the far limit of the truck 130. The truck 130 normally remains at the far limit position while the disk drive 116 is in use.

When the user wishes to eject the disk drive 116, the user again presses the disk drive 116 inward. This time, the end 146 of the follower pin 142 follows the arrow from position 306 to position 308, at which the end 146 of the follower pin 142 is again prevented from translating further from the opening 120. Then, upon the user releasing the inward force on the disk drive 116, the springs 138 force the truck 130 to translate toward the opening 120, until the end 146 of the follower pin 142 reaches position 302 and the truck 130 returns to the near limit. Position 302 is located on the track plate 144 such that, when the truck 130 is at the near limit, at least a sufficient portion of the disk drive 116 extends from the opening 120 to facilitate a user grasping and then pulling the disk drive 116 to unmate the data connectors 122 and 136 and withdrawing the disk drive 116 from the frame 102.

Optionally or alternatively, position 302 is located on the track plate 144 such that, when the truck 130 is at the near limit, none or only a small portion of the disk drive 116 extends from the frame 102. In these embodiments, the frame 102 may define a grab notch 154, sized and configured to reveal at least a sufficient portion of the disk drive 116 for a user to grasp and pull the disk drive 116 to unmate the data connectors 122 and 136 and withdrawing the disk drive 116 from the frame 102. If a bezel or similar front panel (not shown) is used to define an opening aligned with the opening 120 in the frame 102, the bezel, etc. may include a depressed region above and below the opening to accommodate the user's fingers.

With the truck 130 prevented from translating toward the opening 120 any further than the near limit, the user may pull on the disk drive to unmate the disk drive's data connector 122 from the electrical connector 136 and completely withdraw the disk drive 116 from the chassis.

Thus, the track plate 144 alternately limits translation of the truck 130 in a direction toward the opening 120, between the near limit (where the end 146 of the follower pin 142 is in position 302) and the far limit of the truck 130 (where the end 146 of the follower pin 142 is in position 306). As noted, the truck 130 is closer to the opening 120 at the near limit than when the truck 130 is at the far limit.

As noted, at positions 304 and 308, the end 146 of the follower pin 142 is prevented from translating any further away from the opening 120. Positions 304 and 308 can, but need not, be located equal distances from the opening 120. In some embodiments, position 306 is located on the track plate 144 such that, when the truck 130 is at the far limit, the entire disk drive 116 is received within the track 102, such that the end 155 of the disk drive 116, opposite the end with the data connector 122, is approximately flush with the opening 120 in the track 102. In other embodiments, position 306 is located on the track plate 144 such that, when the truck 130 is at the far limit, a portion of the disk drive 116 extends out of the opening 120, while in yet other embodiments, position 306 is located on the track plate 144 such that, under these circumstances, the end 155 of the disk drive 116 is recessed below the plane of the opening 120.

A flexible data cable (not shown) is electrically coupled to the electrical connector 136 and to an electronic circuit (not shown). The flexible data cable is sized and configured to accommodate travel of the truck 130 at least a distance equal to 310 (FIG. 3). The frame 102 is open on one side 156 and defines an opening 158 in the wall 108 to facilitate air circulation for cooling the disk drive 116.

Figure 4:
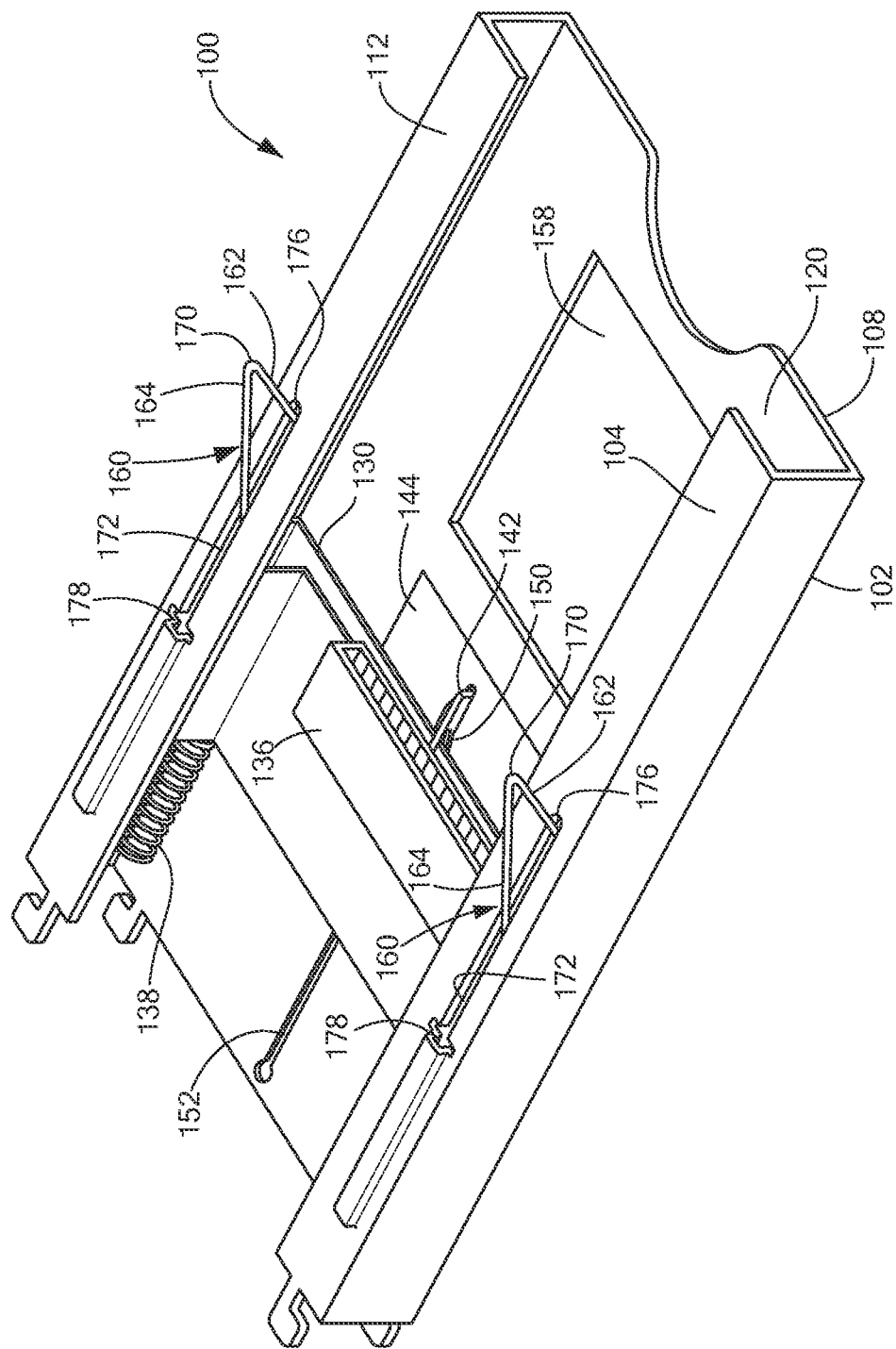
FIG. 4 is a perspective view of the disk drive chassis of FIG. 1, while the truck is at a near limit of travel, ready to receive an inserted disk drive.
Figure 5:
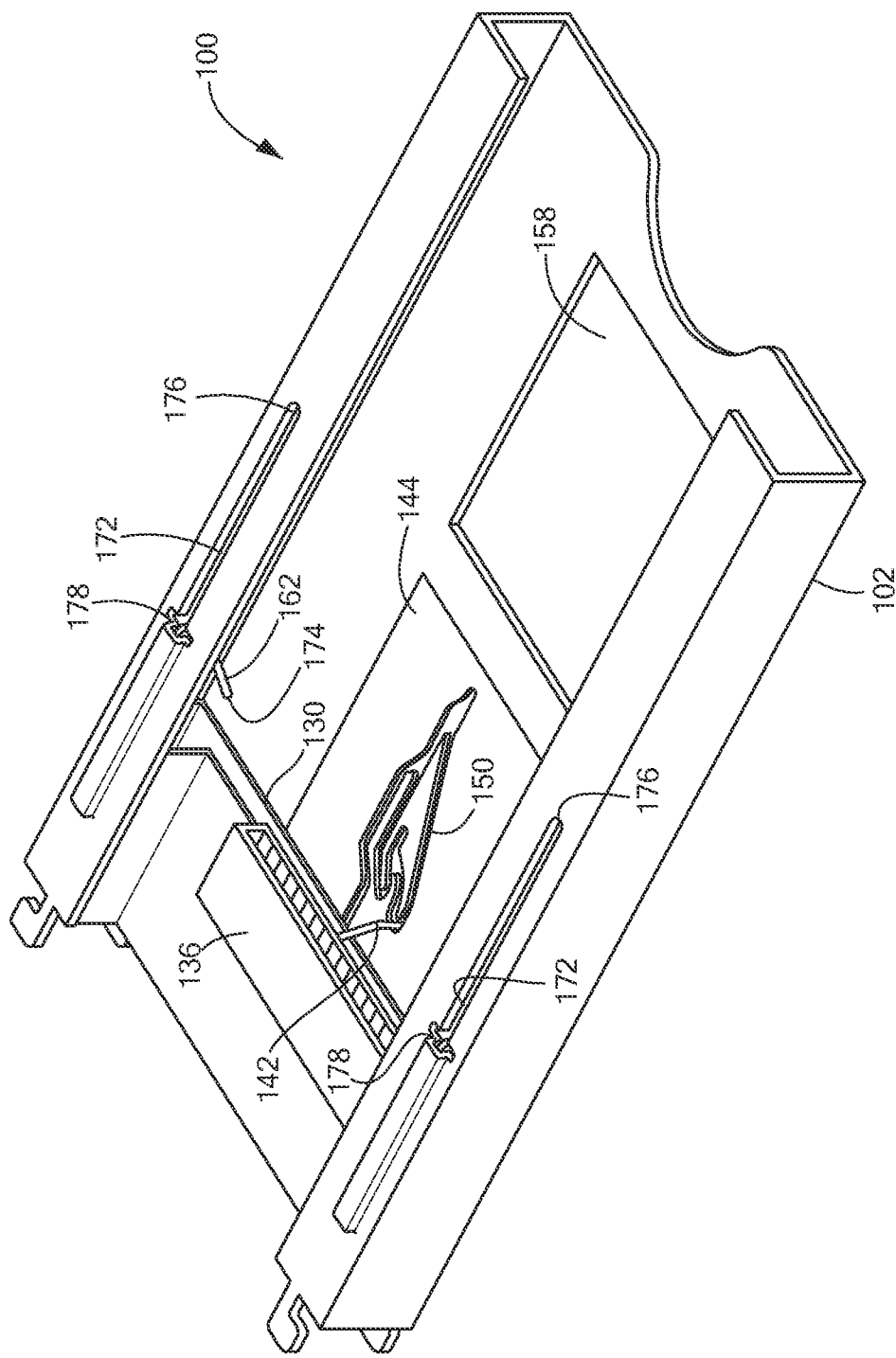
FIG. 5 is a perspective view of the disk drive chassis of FIG. 1, while the truck is at an opposite limit of travel from the limit shown in FIG. 4, such as when the inserted disk drive is fully inserted into the disk drive chassis.
Figure 6:
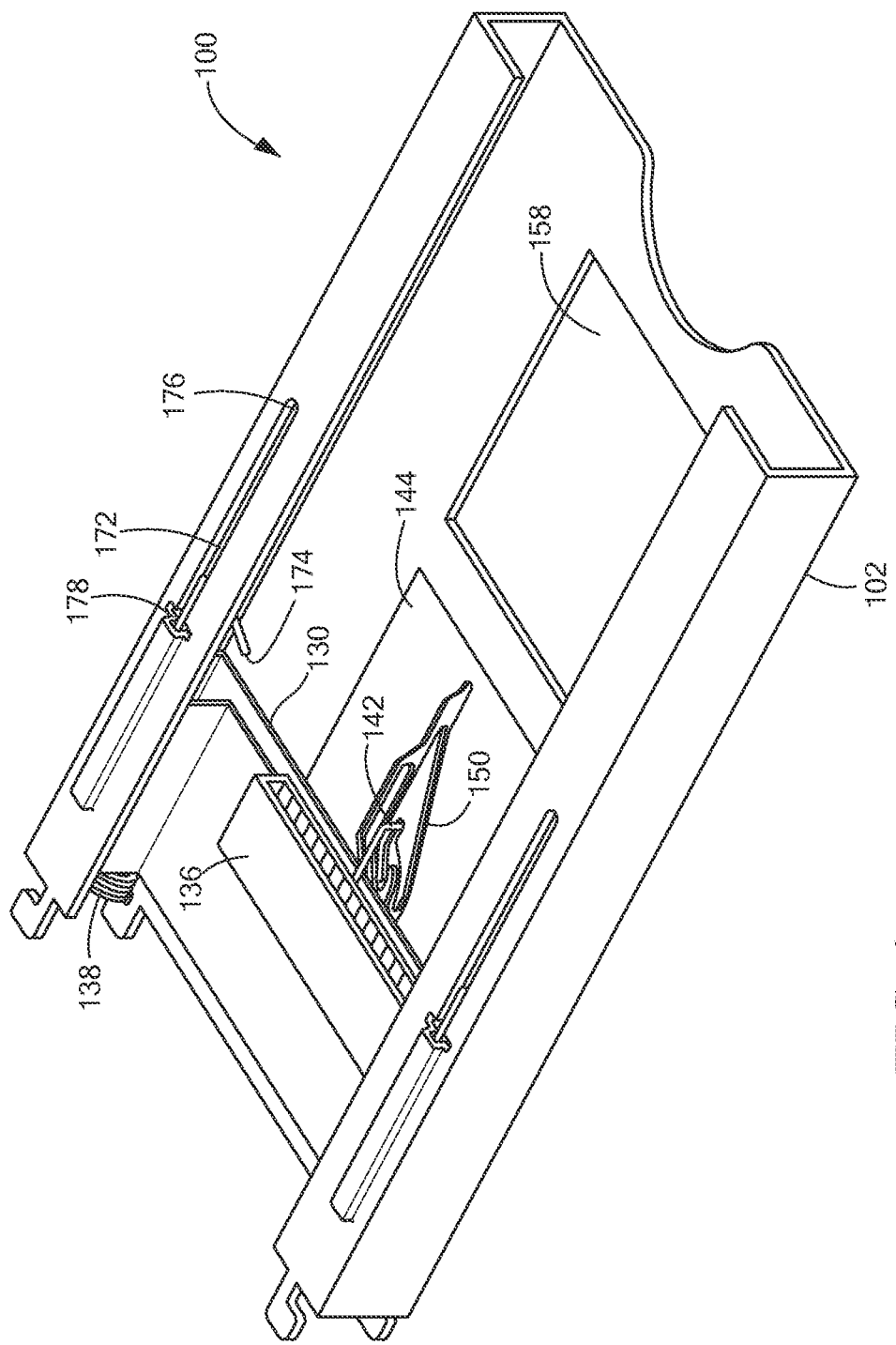
FIG. 6 is a perspective view of the disk drive chassis of FIG. 1, while the truck is at a far limit of travel, when the inserted disk drive has been fully mounted.
Figure 7:
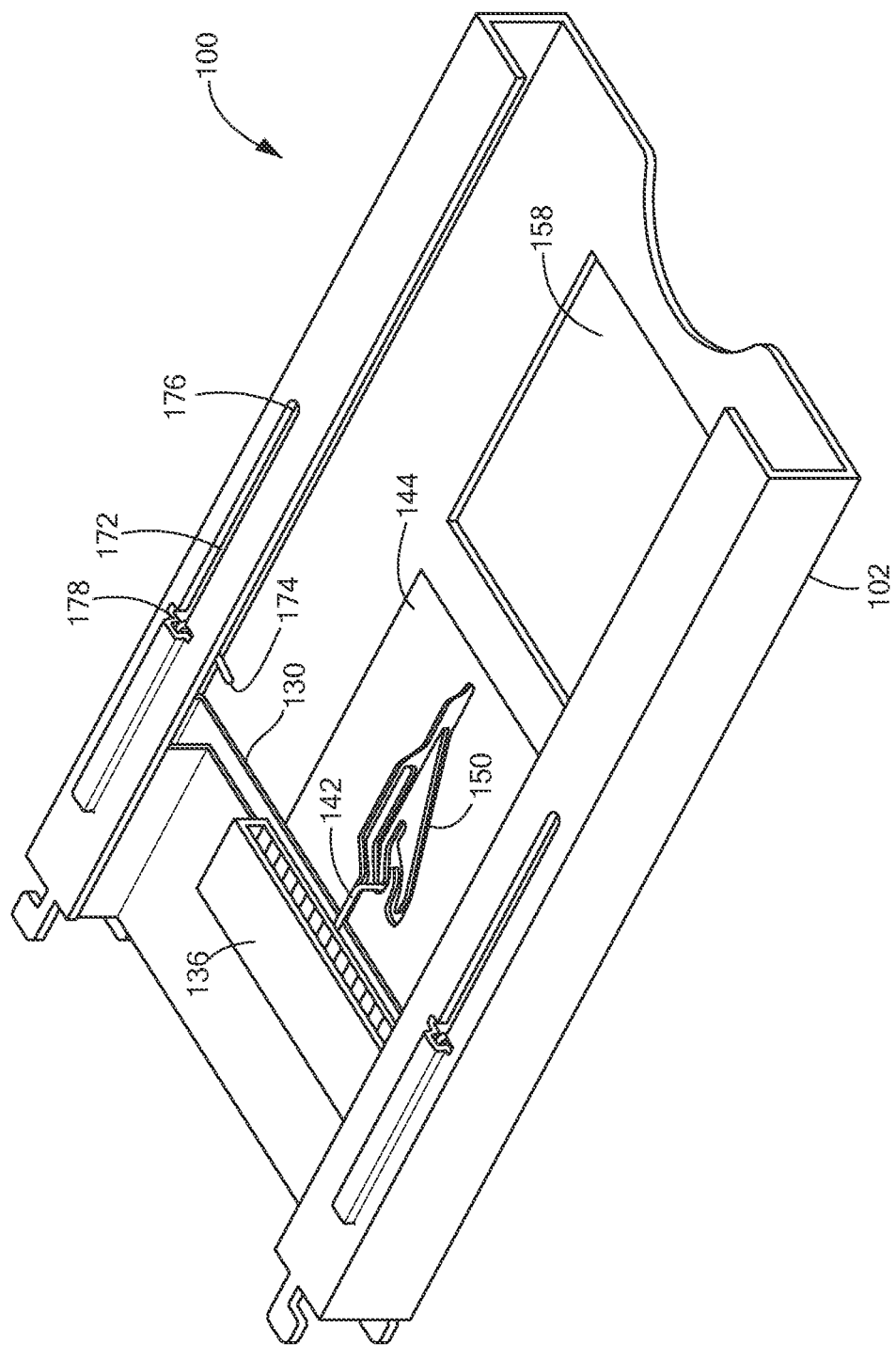
FIG. 7 is a perspective view of the disk drive chassis of FIG. 1, while the truck is at an opposite limit of travel from the limit shown in FIG. 6, such as when the inserted disk drive is being ejected.

FIGS. 4-7 are perspective views of an assembled disk drive chassis 100 showing the truck 130 when the end 146 of the follower pin 142 is at positions 302, 304, 306 and 308, respectively. Consequently, FIG. 4 shows the truck 130 at the near limit, and FIG. 6 shows the truck 130 at the far limit.

Lock Mechanism

Optionally, the disk drive chassis 100 includes a lock mechanism that automatically mechanically locks the disk drive 116 in place, at least while the truck 130 is at the far limit of the truck's translation (FIG. 6), i.e., when the end 146 of the follower pin 142 is in position 306. Locking the disk drive 116 in place provides a more secure attachment of the disk drive 116 to the disk drive chassis 100 than merely relying on friction between the mated data connectors 122 and 136. The lock mechanism automatically unlocks the disk drive 116 to facilitate ejecting the disk drive 116. One embodiment of the lock mechanism will now be described, with reference to FIGS. 1, 2 and 14.

In this embodiment, the lock mechanism includes two resilient lock pins 160 attached to the truck 130, although in other embodiments other numbers of lock pins may be used. Each lock pin 160 includes a downward-projecting portion 162. In an unsprung (rest) position of the lock pins 160, as shown in FIGS. 1 and 2, a sloped portion 164 of each lock pin 160 forms an acute angle 166 (FIG. 2), relative to the top plane 168 of the truck 130. If the sloped portion 164 or an apex 170 of the lock pin 160 is depressed, reducing the angle 166 of the sloped portion 164, the resilience of the lock pin 160 urges the sloped portion 164 and the apex 170 to return to their original (rest) positions. An insert in FIG. 2 shows the lock pin 160 in its rest position in solid line and in two depressed positions in dashed lines.

The walls 104 and 112 of the frame 102 each defines a respective slot 172 parallel to the receiving axis 126. The slots 172 are spaced apart a distance equal to the spacing between the lock pins 160, and the slots 172 are positioned on the walls 104 and 112 such that, when the truck 130 is installed in the track 102, each lock pin 160 aligns with a respective one of the slots 172.

As shown in FIG. 4, when the truck 130 is at the near limit of travel of the truck 130, i.e., the end 146 of the follower pin 142 is at position 302 of the groove 150 (FIG. 3) and the truck 130 is closest to the opening 120, the apex 170 and much of the sloped portion 164 and downward-projecting portion 162 of each lock pin 160 project out of the respective slot 172. In this position of the truck 130, the ends 174 of the downward-projecting portions 162 of the lock pins 160 project little or, alternatively, not at all into the disk drive receiving channel 114. This orientation of the lock pins 160 is referred to as the "unlocked" position.

Optionally, the ends 176 of the slots 172 closest to the opening 120 may be used as stops to limit travel of the truck 130 by preventing further translation of the downward-projecting portions 162 of the lock pins 160 toward the opening 120, beyond the ends 176 of the slots 172.

As the truck 130 translates away from the opening 120 and approaches the truck position shown in FIG. 5 (truck 130 fully depressed as a result of inserting the disk drive 116), the sloped portion 164 of each lock pin 160 eventually contacts the other end 178 of the slot 172. With further translation of the truck 130, the other ends 178 of the slots 172 drive progressively more of the sloped portions 164 under the walls 104 and 112, driving the apex 170 of the lock pins 160 progressively closer to the wall 108 of the frame 102, thereby reducing the angles 166 and forcing the ends 174 of the lock pins 160 progressively further into the disk drive receiving channel 114.

As shown in FIG. 1, a typical 2.5-inch form factor disk drive defines two holes 180 spaced approximately 14.0±0.25 mm (indicated at 182) from an end of the data connector 122 of the disk drive 116. Other form factor disk drives may define similar holes, although with different distances 182.

The downward-projecting portions 162 of the lock pins 160 form acute angles 184 (FIG. 2) with the sloped portions 164. As shown in the insert in FIG. 2, as each lock pin 160 is depressed, its apex 170 follows a curved path, indicated by curved arrows 186 and 188. As each lock pin 160 is depressed, the end 174 of the downward-projecting portion 162 also follows a curved path 190 and 192. Consequently, the depressed end (indicated at 174' and 174") of the lock pin 160 is displaced horizontally a distance from the rest-position end 174 of the lock pin 160. During the initial depression of the lock pins 160, i.e., while the end 174 travels along the first portion 190 of the curved path, the end 174' is displaced a horizontal distance 194 from the initial position of the end 174. This initial displacement 194 is in a direction away from the data connector 136 on the truck 130. However, while the end 174 travels along the second portion 192 of the curved path, the displacement 196 is toward the data connector 136.

Figure 14:
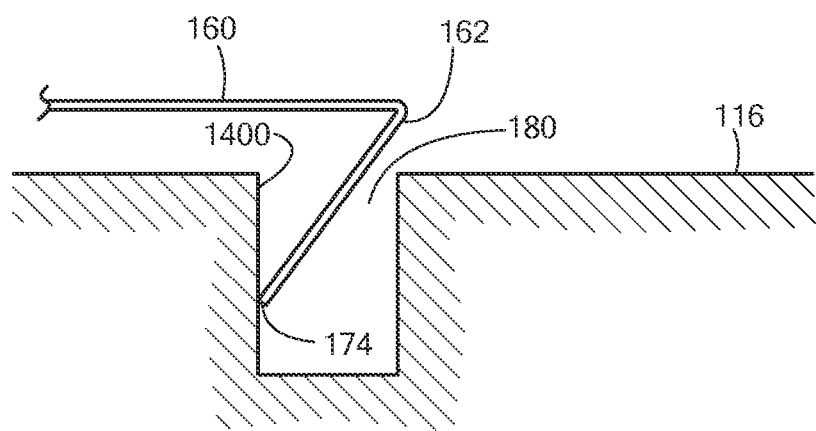
FIG. 14 is a schematic cross-sectional view of a portion of a disk drive and lock pin of the truck of the disk drive chassis of FIG. 1 engaged in a hole defined by the disk drive, according to an embodiment of the present invention.

The lock pins 160 are sized, configured and positioned, relative to the truck 130, so when the data connectors 122 and 136 are fully mated and the lock pins 160 are fully depressed, the downward-projecting portions 162 (or at least the ends 174) of the lock pins 160 align with and engage the holes 180 in the disk drive 116, as shown in FIG. 14. With the lock pins 160 so engaged with the holes 180, the lock pins 160 prevent the data connectors 122 and 136 from unmating, thereby preventing the disk drive 116 from being inadvertently withdrawn (or falling) from the disk drive chassis 100. This orientation of the lock pins 160 is referred to as the "locked" position.

Preferably, the lock pins 160 are configured such that, with the data connectors 122 and 136 fully mated and the lock pins 160 are fully depressed, the ends 174 of the lock pins 160 bear against the walls 1400 of the holes 180 closest to the data connector 122 of the disk drive 116, thereby further preventing the data connectors 122 and 136 from unmating. However, due to the directions of displacements of the ends 174 of the lock pins 160 during the two portions 190 and 192 of the curved paths, the ends 174 clear the walls 1400 as the ends 174 enter and exit the holes 1400.

If the springs 138 are stiff enough so the data connector 122 of an inserted disk drive 116 mates with the electrical connector 136 on the truck 130 before the truck 130 is displaced from the near limit, the ends 174 of the lock pins 160 are driven into the holes 180 as the disk drive 116 is further inserted into the chassis 100 and the truck 130 translates away from the near limit. The lock pins 160 are referred to as being "fully depressed" when they reach the maximum amount of depression possible, as a result of sliding under the walls 104 and 112 of the chassis 100.

Figure 15:
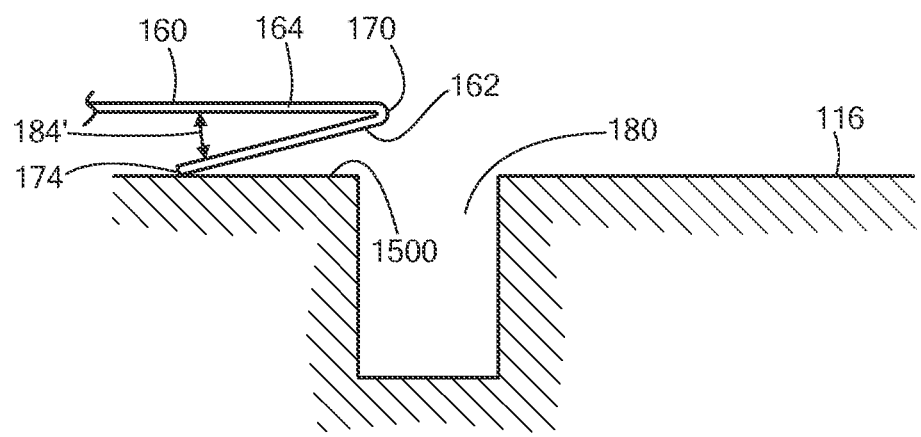
FIG. 15 is a schematic cross-sectional view of a portion of the disk drive and lock pin of FIG. 14, with the lock pin disengaged from the hole.

However, if the springs 138 are less stiff, or for some other reason the data connectors 122 and 136 do not mate before the truck 130 begins to be displaced away from the near limit, the ends 174 of the lock pins 160 may not initially engage the holes 180 in the disk drive 116. In this case, as shown in FIG. 15, as the truck 130 translates away from the near limit, the lock pins 160 are depressed, and the ends 174 of the lock pins 160 may contact and ride along the surface 1500 of the disk drive 116. In effect, the lock pins 160 are squeezed between the under sides of the walls 104 and 112 of the chassis 100 and the surface 1500 of the disk drive 116.

The lock pins 160 may flex at their apexes 170, thereby reducing the angle (indicated at 184') between the downward-projecting portions 162 and the sloped portions 164 of the lock pins 160. The sloped portion 164, the apex 170 and the downward-projecting portion 162 of each lock pin 160 act as a spring, and flexing of the lock pins 160 loads these springs, thereby urging the ends 174 of the lock pins 160 toward the disk drive 116. The sprung ends 174 of the lock pins 160 may ride along the surface 1500 of the disk drive 116. However, once the truck 130 reaches the furthest extent of its translation away from the near limit, corresponding to position 304 along the groove 150, and the disk drive 116 is further inserted so as to mate the two data connectors 122 and 136, the disk drive 116 moves closer to the (now stationary) truck 130. This movement of the disk drive 116 moves the holes 180 under the ends 174 of the lock pins 160, and the ends 174 then engage the holes 180, thereby unloading the springs formed by the sloped portions 164, the apexes 170 and the downward-projecting portions 162. The truck 130, the lock pins 160 and the slots 172 are further sized and configured, such that at least portions of the downward-projecting portions 162 of the lock pins 160 project into the holes 180 of the disk drive 116 when the truck is in the position shown in FIG. 6, i.e., when the end 146 of the follower pin 142 is at position 306 and the truck 130 is at the far limit of its travel.

While the user ejects the inserted disk drive 116, as the truck 130 approaches the position shown in FIG. 4 (the near limit of the truck's travel), progressively more of the lock pins 160 project through the slots 172 and the lock pins 160 withdraw from the holes 180, due to the resilience of the lock pins 160. By the time the truck 130 reaches the position shown in FIG. 4, the lock pins 160 are fully withdrawn from the holes 180, and the user may remove the disk drive 116 from the frame 102.

Alternative Toggle Configurations

As noted, translation of the truck 130 along the receiving axis 126 is limited by the toggle 140 which, in the above-describe embodiment, includes a follower pin 142 attached to the truck 130 and a track plate 144 attached to the frame 102. However, in another embodiment (not shown), the track plate 144 is attached to, or is part of, the truck 130 for translation with the truck 130, and the resilient follower pin is attached to the frame 102. For example, the track plate 144 may be attached to, or may be part of, the bottom 200 (FIG. 2) of the truck 130. Nevertheless, the track plate 144 and, therefore, the toggle 140 are parallel to the major axis 124 of the opening 120 and parallel to the receiving axis 126.

The track plate 144 may be fabricated from a suitable plastic with the groove 150 formed in one surface thereof by any suitable process, such as injection molding or routing. The material of the track plate 144 should have a relatively low coefficient of friction with the follower pin 142. The material of the track plate 144 should have sufficient toughness to withstand an expected number of traversals through the groove 150 by the follower pin 142, without premature failure. Optionally, the track plate 144 may be fabricated by laminating a suitable material, such as plastic, to a more rigid substrate, such as a metal plate. In this case, the groove 150 may extend through the entire thickness of the top layer(s) of the laminated material. Other suitable configurations are also acceptable.

Figure 8:
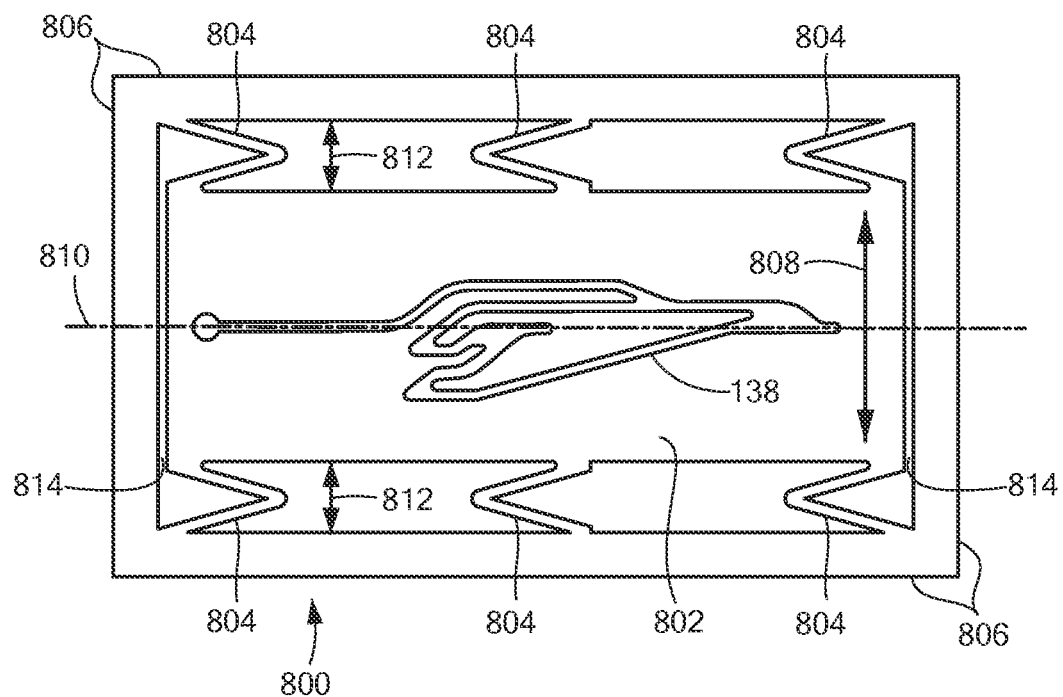
FIG. 8 is a plan view of a track plate of the disk drive chassis of FIG. 1, according to an alternative embodiment of the present invention.

FIG. 8 is a plan view of another alternative track plate 800 that provides some or all of the resilience needed to urge the end 174 of the follower pin 142 to return to its neutral position, relative to the track plate 800. The alternative track plate 800 defines a groove 150, as described above, with respect to FIG. 3. However, a portion 802 of the track plate surrounding the groove 150 is attached via a plurality of flexures 804 to a spaced-apart frame portion 806 of the track plate 800. The surrounding portion 802 and, therefore, the groove 150 can translate reciprocally, as indicated by two-headed arrow 808, within the frame portion 806. The frame 806, the surrounding portion 802 and the reciprocation are all coplanar.

The flexures 804 urge the portion 802 surrounding the groove 150 and, therefore, the groove 150 to return to a neutral position. Therefore, the groove 150 translates reciprocally about a line 810, which corresponds to the line 300 discussed above, with respect to FIG. 3. Spaces 812, within which the surrounding portion 802 reciprocates, are large enough to accommodate travel of the end 174 of the follower pin 142 within the groove 150. However, spaces 814 (exaggerated in size in FIG. 8 for clarity) between the surrounding portion 802 and the frame 806, extending in a direction parallel to the direction 808 of reciprocal translation, are large enough to prevent undue friction, but small enough to prevent the surrounding portion 802 from translating an undue amount in a direction perpendicular to the direction 808 of reciprocal translation. A tongue-in-groove or other type of guide may be used between the surrounding portion 802 and the frame 806 to maintain their co-planarity. Thus, in disk drive chassis 100 that employ the alternative track plate 800, the follower pin 142 need not, but can, be resilient.

The alternative track plate 800 may be made of plastic with suitable characteristics. For example, the plastic should be resilient, at least in thicknesses of the flexures 804. In addition, the plastic should be tough enough and have a relatively low coefficient of friction, so as to withstand an expected number of bendings of the flexures 804 and sliding contacts along the spaces 814, without premature failure. The alternative track plate 800 may be fabricated from a single piece of material or a combination of pieces of similar or dissimilar materials. For example, the frame 806 and the portion 802 surrounding the groove 150 may be made of plastic, and the flexures may be made of suitably resilient metal attached to the plastic pieces by imbedding the metal in the plastic during an injection molding process or by any other suitable attachment technique. Other numbers, materials and configurations of flexures 804 may be used. The alternative track plate 800 may be use in any suitable embodiment of the disk drive chassis 100.

Figure 9:
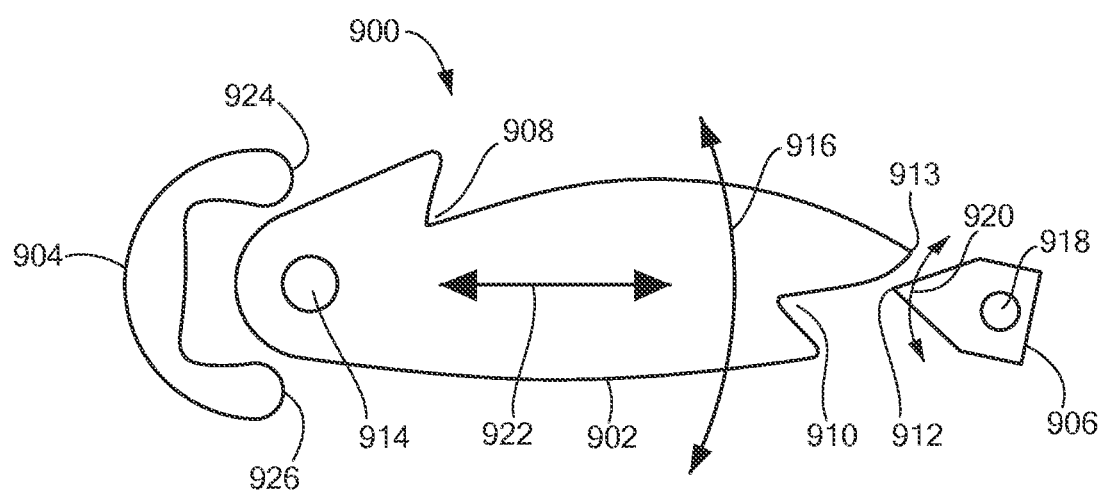
FIG. 9 is a plan view of a toggle of the disk drive chassis of FIG. 1, according to an alternative embodiment of the present invention.

FIG. 9 is a plan view of another alternative toggle 900 that includes a pivoted multi-notched cam 902, which is attached to the truck 130, and a non-pivoted stop 904 and a pivoted stop 906, both of which are attached to the frame 102. The multi-notched cam 902 defines two notches 908 and 910 along its working surface (perimeter), and the pivoted stop 906 defines a point 912 that acts somewhat like a pawl by alternatingly engaging one of the notches 908 and 910. Collectively, the multi-notched cam 902 and the two stops 904 and 906 limit reciprocal translation of the truck 130 along the receiving axis 126. The two notches 908 and 910 correspond to the near limit and the far limit, respectively, of the truck's translation. The multi-notched cam 902 defines a tip 913 along the working surface, between the two notches 908 and 910. The multi-notched cam 902 is attached to the truck 130 by a pivot pin 914, about which the multi-notched cam 902 pivots, as indicated by two-headed arrow 916. The pivoted stop 906 is attached to the frame 102 by a pivot pin 918, about which the pivoted stop 906 pivots, as indicated by two-headed arrow 920.

In use, the multi-notched cam 902 reciprocally translates, as indicated by two-headed arrow 922, relative to the non-pivoted stop 904 and the pivot pin 918. The pivots 914 and 918 are free enough, such that when the multi-notched cam 902 contacts the pivoted stop 906 under the urging of the springs 138 (FIG. 1), the multi-notched cam 902 and the pivoted stop 906 both can pivot, so as to reach mutual orientations in which the pivoted stop 906 engages the multi-notched cam 902 and the multi-notched cam 902 has translated as far to the right as possible. ("Right" here refers to a direction along the axis 922, as shown in FIG. 9.) Similarly, the pivot 914 is free enough, such that when the multi-notched cam 902 contacts either of two lobes 924 or 926 of the non-pivoted stop 904, the lobe 924 or 926 causes the multi-notched cam 902 to pivot.

However, pivots 914 and 918 are stiff enough, such that when the multi-notched cam 902 looses contact with the pivoted stop 906 or the lobe 924 or 926, the multi-notched cam 902 and the pivoted stop 906 maintain their pivotal orientations. Thus, after the multi-notched cam 902 ceases to be in contact with the pivoted stop 906, the multi-notched cam 902 and the pivoted stop 906 remain in their most recent pivotal orientations, absent an external force. Likewise, after the multi-notched cam 902 ceases to be in contact with the non-pivoted stop 904, the multi-notched cam 902 remains in its most recent pivotal orientation, absent an external force.

The two stops 904 and 906 are attached to the frame 102 along an axis parallel to the receiving axis 126, with the pivoted stop 906 closer to the opening 120 in the frame 102 than the non-pivoted stop 904 is to the opening 120. Thus, as the truck 130 translates along the receiving axis 126, the multi-notched cam 902 translates between the two stops 904 and 906, as indicated by the two-headed arrow 922. The pivoted stop 906 is attached to the frame 102 via the pivot pin 918. Thus, the spacing between the non-pivoted stop 906 and the pivot pin 918 remains constant. This spacing conforms to the maximum distance 310 (FIG. 3) the truck 130 can translate along the receiving axis 126.

Although the multi-notched cam 902 translates between the two stops 904 and 906, the maximum distance the multi-notched cam 902 can translate in the direction of the pivoted cam 906 depends on the orientation of the multi-notched cam 902 and the orientation of the pivoted stop 906. This also limits translation of the truck 130.

Figure 10:
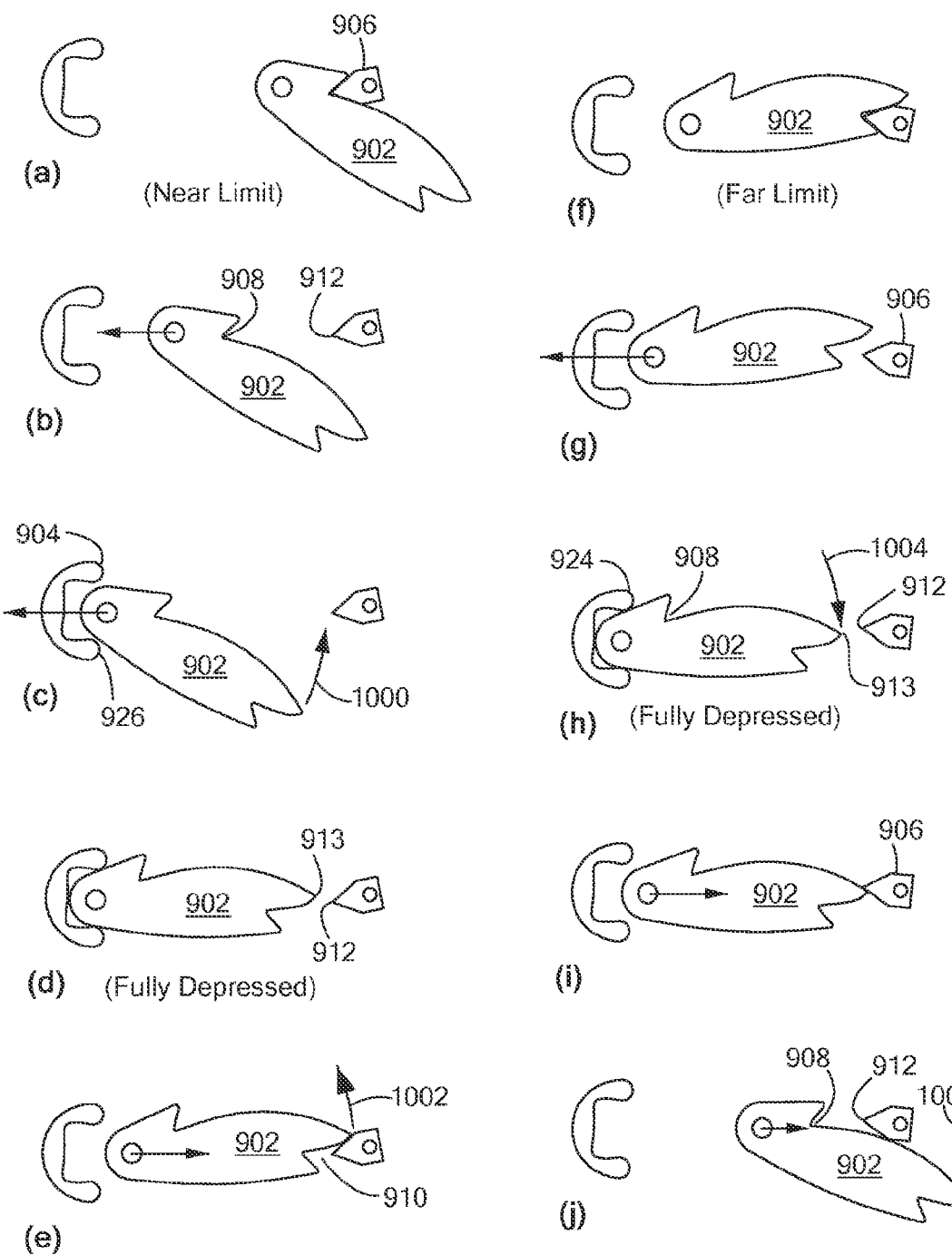
FIG. 10 schematically illustrates nine orientations, (a) to (i), of components of the toggle of FIG. 9.

FIG. 10 schematically illustrates ten orientations, (a) to (j), of the components of the toggle 900. Straight arrows indicate directions of translation. In FIG. 10(a), the truck 130 (FIG. 1) is at the near limit of its translation. Note the orientation of the multi-notched cam 902 and that the pivoted stop 906 engages the near limit notch 908. In FIG. 10(b), the truck 130 has translated slightly away from the near limit, for example as a result of an inserted disk drive 116 contacting the truck 130 and slightly displacing the truck 130. Note the orientation of the pivoted stop 906, with the point 912 directed slightly below horizontal.

As the disk drive 116 is inserted progressively further into the disk drive receiver channel 114, the truck 130 translates progressively further along the receiving axis 126, and the multi-notched cam 902 translates further along the axis 922 (FIG. 9). In FIG. 10(c), the multi-notched cam 902 has just made contact with the lower lobe 926 of the non-pivoted stop 904. This contact, and further translation of the multi-notched cam 902 toward the non-pivoted stop 904, forces the multi-notched cam 902 to pivot counter-clockwise, as indicated by arrow 1000, until the truck 130 is fully depressed and the multi-notched cam 902 is oriented as shown in FIG. 10(d). Note that the tip 913 of the multi-notched cam 902 is oriented above the point 912 of the pivoted stop 906.

The non-pivoted stop 904 prevents further translation of the multi-notched cam 906 in a direction away from the opening 120 of the disk drive chassis 100.

In FIG. 10(e), the truck 130 has translated away from its fully-depressed position, under urging of the springs 138 (FIG. 1), and the multi-notched cam 902 has just contacted the pivoted stop 906. Because the tip 913 of the multi-notched cam 902 is above the point 912 of the pivoted stop 906, the pivoted stop 906 rides along the working surface of the multi-notched cam 902 until the point 912 of the pivoted stop 906 engages the far limit notch 910, as shown in FIG. 10 (f). As the multi-notched cam 902 and the pivoted stop 906 transition from the orientations shown in FIG. 10(e) to the orientations shown in FIG. 10(f), the multi-notched cam 902 pivots slightly counter-clockwise, as indicated by arrow 1002, and the point 912 of the pivoted stop 906 is reoriented from facing slightly below horizontal to facing slightly above horizontal. In FIG. 10(f), the truck 130 is at the far limit of the truck's translation.

Early in the disk drive ejection process, in FIG. 10(g), the truck 130 has translated slightly away from the far limit. In FIG. 10(h), the truck 130 is fully depressed, and the upper lobe 924 of the non-pivoted stop 904 has forced the multi-notched cam 902 to pivot clockwise, as indicated by arrow 1004, until the tip 913 of the multi-notched cam 902 is blow the point 912 of the pivoted stop 906.

When the user releases pressure on the to-be-ejected disk drive 116, the truck 130 begins to return to the near limit. In FIG. 10(i), the truck 130 has translated slightly away from the fully-depressed position, and the multi-notched cam 902 has contacted the pivoted stop 906. Because the tip 913 of the multi-notched cam 902 is below the point 912 of the pivoted stop 906, the pivoted stop 906 rides along the working surface of the multi-notched cam 902 toward the near limit notch 908 and, as shown in FIG. 10(j), the multi-notched cam 902 is forced to pivot clockwise, as indicated by arrow 1006. As the portion of the multi-notched cam 902 that defines the near limit notch 908 contacts the point 912 of the pivoted stop 906, the pivoted stop 906 is forced to pivot counter-clockwise to face slightly below horizontal, and the multi-notched cam 902 and the pivoted stop 906 return to the orientations shown in FIG. 10(a).

The pivoted multi-notched cam 902 and the stops 904 and 906 can be fabricated of any suitable material, such as plastic, metal or a combination of materials. The pivoted multi-notched cam 902 and the stops 904 and 906 are generally planar, as shown in FIG. 10, although they do, of course, have some thickness. The pivoted multi-notched cam 902 and the stops 904 and 906 may be disposed in approximately the same locations as the above-described track plate 144. For example, the stops 904 and 906 may be mounted on a plate located where the track plate 144 is shown in FIG. 1, and the pivoted multi-notched cam 902 can be mounted on the bottom 200 of the truck 130. Alternatively, the stops 904 and 906 may be mounted on the bottom of the truck 130, and the pivoted multi-notched cam 902 can be mounted on a plate located where the track plate 144 is shown in FIG. 1. Thus, in either case, the pivoted multi-notched cam 902 and the stops 904 and 906 are parallel to the major axis 124 of the opening 120 and parallel to the receiving axis 126.

Data Storage System

Figure 11:
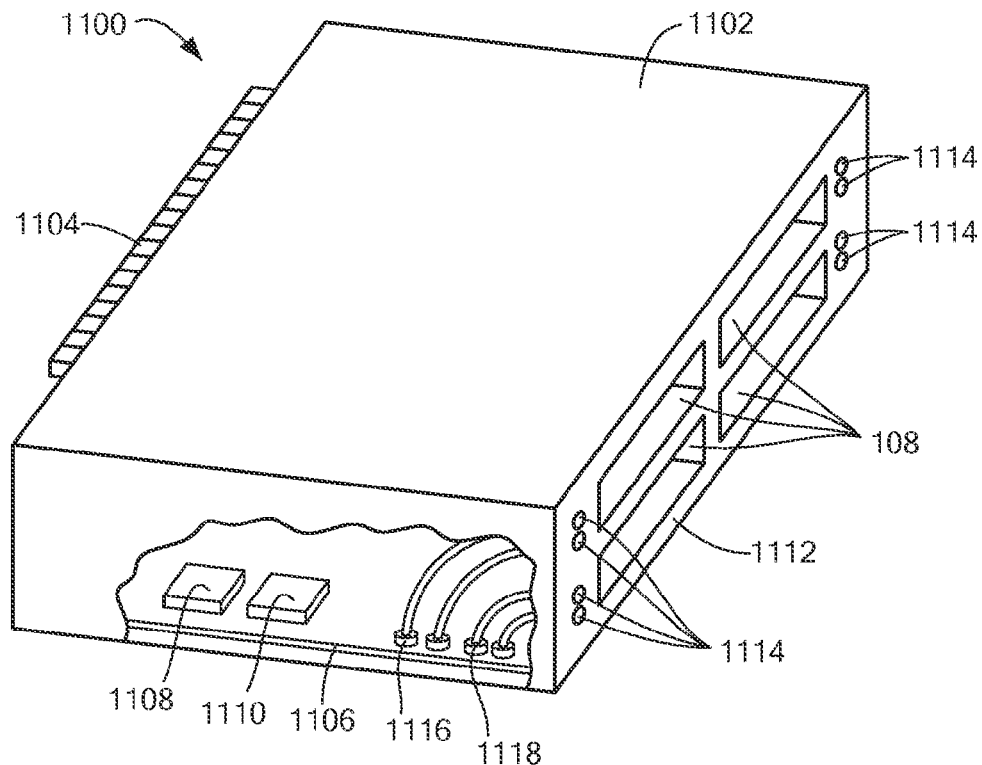
FIG. 11 is a perspective cut-away schematic view of a data storage system that includes a plurality of the disk drive chassis of FIG. 1, according to an embodiment of the present invention.

More than one push-push eject disk drive chassis 100 (any embodiment described above or variation thereon) can be combined in a single housing to provide a data storage system. FIG. 11 is a perspective cut-away schematic view of one embodiment of such a data storage system 1100 that supports up to four user-swappable disk drives. Other such data storage systems may support other numbers of disk drives. The data storage system 1100 includes a housing 1102 that conforms to a disk drive form factor, including a disk drive data connector 1104. In one embodiment, the housing 1102 conforms to a 5.25-inch disk drive form factor and can be installed into a disk drive bay of a user computer (not shown). Four disk drive chassis, each configured to accept a disk drive of a smaller form factor, such as a 2.5-inch form factor disk drive, are disposed within the housing 1102. Each disk drive chassis 100 may include one or more mounting tabs, exemplified by tabs 198 and 199 in FIG. 1, by which the chassis 100 may be attached to the housing 1102 or to another structure within the housing 1102. Each of these disk drive chassis defines an opening 120 (FIG. 1), through which a disk drive (not shown) can be received, as discussed above.

The design of the disk drive chassis 100 makes the chassis narrow enough so that, in this embodiment, two 2.5-inch form factor disk drive chassis fit side-by-side within a 5.25-inch disk drive form factor housing 1102. In contrast, no prior art user-swappable, caddy-less, tool-less disk drive chassis can fit two such disk drives side-by-side in a 5.25-inch form factor. The superiority of the presently disclose disk drive chassis 100 is due, at least in part, to the location of the toggle 140 over or under the truck 130 and parallel to the wall 108 of the chassis, rather than on one or both sides of the chassis.

The electrical connector 136 (FIG. 1) of each of the disk drive chassis is connected by a suitable cable (not shown) to electronics, in the form of a circuit board 1106, disposed within the housing 1102. The circuit board 1106 may be oriented parallel to the major axes 124 (FIG. 1) of the disk drive chassis 100. The circuit board 1106 may include a processor 1108 and a memory 1110 containing instructions to be executed by the processor 1108. Thus, the circuit board 1106 may be configured to manage storage space on any disk drives installed in the chassis 100 and present the cumulative storage space (less space used for overhead and redundancy) as a single virtual disk drive to the user computer via the data connector 1104.

A front panel 1112 of the housing 1102 may include one or more visual indicators 1114 to display status information about any disk drive(s) received by the push-push eject disk drive chassis. The indicators 1114 may be located proximate corresponding openings 108. In one embodiment, light-emitting diodes (LEDs), exemplified by LED 1116, on the circuit board 1106 are controlled by the processor 1108 and are coupled by optical fibers, plastic rods or other suitable light pipes, exemplified by light pipe 1118, to respective apertures defined in the front panel 1112 to indicate the status. Optionally or alternatively, the LEDs may be mounted in the front panel 1112 and coupled to the circuit board 1106 by wires. The indicated status information may be in the form of a color and/or blink code. For example, a steady green light may indicate that a corresponding installed disk drive is operating correctly and that the disk drive may be removed from the data storage system 1100, whereas an alternating green and yellow light may indicate that data transfer activity is in progress and that the corresponding disk drive should not be removed until the activity has completed. A blinking yellow light may indicate that the data storage system 1100 has identified a flaw associated with the corresponding disk drive. Optionally or alternatively, the status indicator(s) may indicate used or remaining storage space on the installed disk drives.

Figure 12:
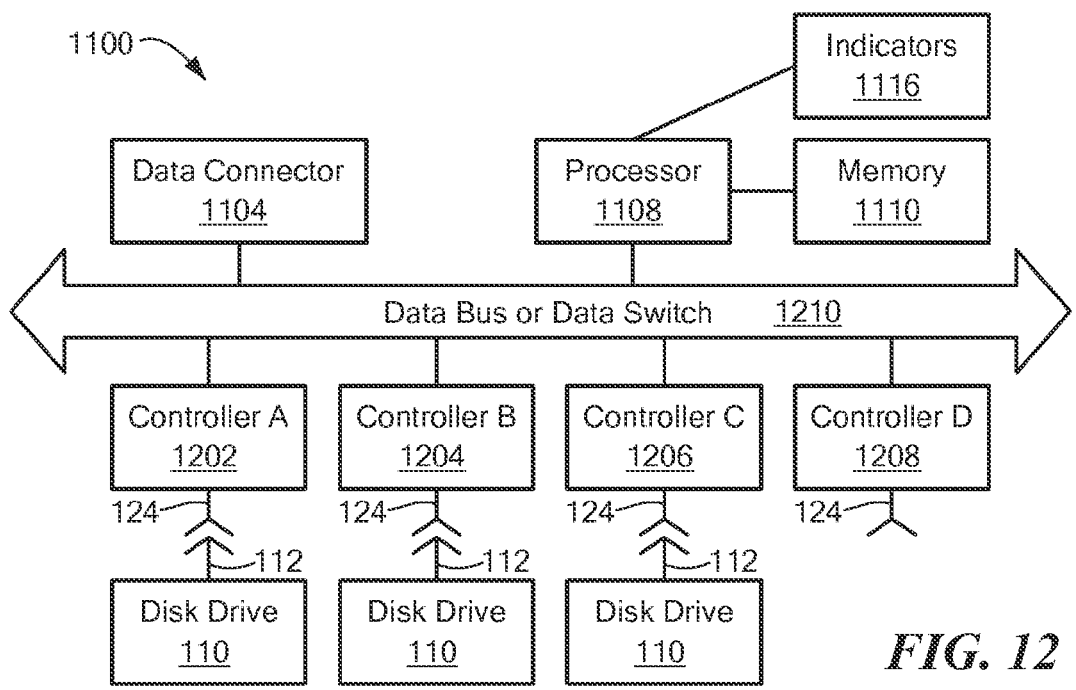
FIG. 12 is a schematic block diagram of the data storage system of FIG. 11.

FIG. 12 is a schematic block diagram of the data storage system 1100. The data storage system 1100 includes controllers 1202, 1204, 1206 and 1208, one controller for each disk drive chassis. The data storage system 1100 includes a data connector 1104, by which the data storage system 1100 may be communicatively coupled to the user computer. The processor 1108 executes instructions stored in the memory 1110 to control operation of the data storage system 1100. A data bus or a data switch 1210 interconnects the processor 1108 and the other major subsystems of the data storage system 1100. The processor 1108 controls indicators 1116 (such as LEDs) to indicate which disk drive chassis have disk drives installed in them and their status.

Thus, the data storage system 1100 can user-swappably accept a plurality of side-by-side disk drives, without tools or a caddies, and yet the housing 1102 fits within a standard disk drive form factor.

A data storage system has been described as including a processor controlled by instructions stored in a memory. The memory may be random access memory (RAM), read-only memory (ROM), flash memory or any other memory, or combination thereof, suitable for storing control software or other instructions and data. Some of the functions performed by the data storage system have been described with reference to block diagrams. Those skilled in the art should readily appreciate that functions, operations, decisions, etc. of all or a portion of each block, or a combination of blocks, of the block diagrams may be implemented as computer program instructions, software, hardware, firmware or combinations thereof Those skilled in the art should also readily appreciate that instructions or programs defining the functions of the present invention may be delivered to a processor in many forms, including, but not limited to, information permanently stored on tangible non-writable storage media (e.g. read-only memory devices within a computer, such as ROM, or devices readable by a computer I/O attachment, such as CD-ROM or DVD disks), information alterably stored on tangible writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, and variations of, the illustrated embodiments may be made without departing from the inventive concepts disclosed herein. For example, dimensions are exemplary and may be modified, as appropriate, for other form factors and other numbers and/or configurations of disk drive chassis within a data storage system. Furthermore, disclosed aspects, or portions of these aspects, may be combined in ways not listed above. Accordingly, the invention should not be viewed as being limited to the disclosed embodiments.

What is claimed is:

1. A push-push eject disk drive chassis, comprising:
    a frame defining an opening having a major axis, the frame being configured to receive at least a portion of a disk drive, through the opening, along a receiving axis;
    a truck disposed within the frame and configured for reciprocal translation, relative to the frame, along the receiving axis;
    a spring coupled to the truck and configured to urge the truck toward the opening;
    an electrical connector attached to the truck for translation therewith and configured to electrically couple with a received disk drive; and
    a toggle disposed in a plane oriented parallel to the major axis of the opening and parallel to the receiving axis, the toggle being mechanically coupled to the truck and configured to alternately limit translation of the truck toward the opening between a near limit and a far limit of the truck, wherein the truck is closer to the opening at the near limit than at the far limit.

2. A push-push eject disk drive chassis according to claim 1, wherein the toggle comprises:
    a track plate oriented parallel to the major axis of the opening and parallel to the receiving axis, the track plate defining a track; and
    a follower pin, at least a portion of the follower pin being disposed within the track; wherein:
    one of the track plate and the follower pin is attached to the truck for translation therewith, such that a position of the follower pin, along the track, depends at least in part on a position of the truck along the receiving axis; and
    the track and the follower pin are configured such that a first location along the track corresponds to the far limit of the truck and, absent an external force on the truck along the receiving axis, force of the spring maintains the follower pin at the first location along the track.

3. A push-push eject disk drive chassis according to claim 2, wherein the track comprises a groove defined in a surface of the track plate.

4. A push-push eject disk drive chassis according to claim 3, wherein the track comprises a tortuous loop track.

5. A push-push eject disk drive chassis according to claim 4, wherein the track plate further defines a lead-in portion extending from an edge of the track plate to the loop track and configured to:
    guide the follower pin from the edge of the track plate to the loop track; and
    once the follower pin is in the loop track, prevent the follower pin escaping the loop track, via the lead-in portion, to the edge of the track plate, absent an external force on the follower pin.

6. A push-push eject disk drive chassis according to claim 4, wherein the track is further configured to limit translation of the truck to between the near limit of the truck and a third position more distant from the opening than the far limit of the truck.

7. A push-push eject disk drive chassis according to claim 1, wherein the toggle comprises:
    a pivoted multi-notched cam;
    a non-pivoted stop; and
    a pivoted stop.

8. A push-push eject disk drive chassis according to claim 1, further comprising a lock configured to be automatically engaged with a received disk drive when the truck is at the far limit and to be automatically disengaged from the received disk drive when the truck is at the near limit.

9. A push-push eject disk drive chassis according to claim 1, further comprising a lock configured to automatically engage a received disk drive as the truck translates away from the near truck limit and to automatically disengage the received disk drive as the truck translates toward the near truck limit.

10. A push-push eject disk drive chassis according to claim 9, wherein:
    the frame defines a lock track extending parallel to the receiving axis; and
    the lock comprises:
        a sloped portion configured to reciprocally translate within the lock track; and
        a lock pin connected to the sloped portion and configured to selectively engage a hole defined by the received disk drive;
    wherein the sloped portion, the lock pin and the lock track are configured such that, as the sloped portion translates away from the near truck limit, proximate an end of the lock track, the end of the lock track progressively depresses the sloped portion, thereby progressively engaging the lock pin into the hole.

11. A push-push eject disk drive chassis according to claim 10, wherein:
    the frame defines a second lock track extending parallel to the receiving axis; and
    the lock comprises:
        a second sloped portion configured to reciprocally translate within the second lock track; and
        a second lock pin connected to the second sloped portion and configured to selectively engage a second hole defined by the received disk drive;
    wherein the second sloped portion, the second lock pin and the second lock track are configured such that, as the second sloped portion translates away from the near truck limit, proximate an end of the second lock track, the end of the second lock track progressively depresses the second sloped portion, thereby progressively engaging the second lock pin into the second hole.

12. A data storage system, comprising:
a housing configured according to a standard disk drive form factor, including an output disk drive data connector, wherein the housing defines four openings in a front panel thereof;
four push-push eject disk drive chassis disposed within the housing, each push-push eject disk drive chassis aligned with a respective one of the four openings in the front panel and oriented to user-swappably receive at least a portion of a disk drive through the respective opening in the front panel, wherein each push-push eject disk drive chassis comprises:
- a frame defining an opening having a major axis, the frame being configured to receive at least a portion of a disk drive, through the opening, along a receiving axis;
- a truck disposed within the frame and configured for reciprocal translation, relative to the frame, along the receiving axis;
- a spring coupled to the truck and configured to urge the truck toward the opening; and
- a toggle disposed in a plane oriented parallel to the major axis of the opening and parallel to the receiving axis, the toggle being mechanically coupled to the truck and configured to alternately limit translation of the truck toward the opening between a near limit and a far limit of the truck, wherein the truck is closer to the opening at the near limit than at the far limit; and a circuit board disposed within the housing and electrically coupled to the output disk drive data connector and to a respective disk drive data connector of each of the push-push eject disk drive chassis, the circuit board being configured to manage data storage space on any disk drives received by the four push-push eject disk drive chassis and electrically coupled to the respective disk drive data connectors thereof, so as to present the data storage space of the received disk drives as a single disk drive, via the output disk drive data connector.

13. A data storage system according to claim 12, further comprising, for each of the four push-push eject disk drive chassis, at least one corresponding visual indicator in the front panel and coupled to the circuit board so as to display status information about any disk drive received by the push-push eject disk drive chassis and electrically coupled to the disk drive data connector thereof.

14. A data storage system according to claim 13, wherein each of the at least one visual indicators is coupled to the circuit board via a respective light pipe.

15. A data storage system according to claim 12, wherein:
the housing is configured to conform to a 5.25-inch disk drive form factor; and
each of the four push-push eject disk drive chassis is configured to receive a 2.25-inch form factor disk drive.

\* \* \* \* \*